Dec. 10, 1929.　　G. B. WILSON ET AL　　1,738,861
LUBRICATING GUN
Filed June 7, 1928
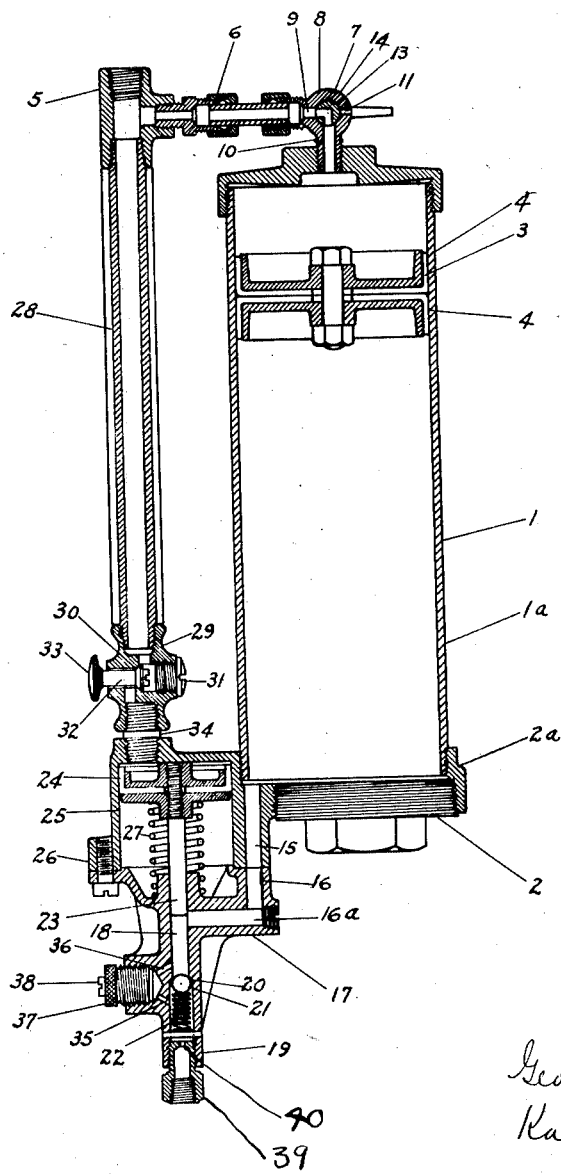

Patented Dec. 10, 1929

1,738,861

UNITED STATES PATENT OFFICE

GEORGE B. WILSON AND KARL C. EAGLEY, OF ERIE, PENNSYLVANIA, ASSIGNORS TO SERVICE MANUFACTURING COMPANY, OF ERIE, PENNSYLVANIA, A CORPORATION OF DELAWARE

LUBRICATING GUN

Application filed June 7, 1928. Serial No. 283,594.

This invention is designed to improve grease guns, particularly in the manner of operating the same. A pneumatic means is provided through which the entire mechanism may be readily operated, forcing the grease forward, cutting off measured charges, and delivering the same to the nozzle. Features and details of the invention will appear from the specification and claims.

A preferred embodiment of the invention is illustrated in the accompanying drawings as follows:—

The drawing shows a vertical section through the device.

1 marks the supply cylinder. This has a head 2ª in which is arranged a loading opening with a screw-threaded cover 2. A floating plunger 3 is arranged in the cylinder. This has reverse faced cups 4.

Air is supplied through a supply inlet 5, this being in the form of a T. A branch 6 extends from the T to a three-way valve 7. Three-way valve has a body 8 with an inlet port 9 leading from the connection 6, a discharge port 10 leading from the valve to the cylinder, and an exhaust port 11. A plug 13 is provided with a right-angle way 14 in the usual manner of three-way valves. It will readily be seen that by operating a three-way valve air may be placed in the cylinder back of the plunger 3, or the air may be cut off from the supply and the air exhausted from the cylinder 1.

A discharge passage 15 is formed in the head 2ª. It connects with a passage 16 in a nozzle fitting 17. The passage 16 extends laterally by a passage 16ª into a chamber 18. The nozzle is provided with a connecting mechanism, as screw threads 19 through which it may be connected with the port to receive the grease. A valve seat 20 is arranged in the nozzle and a yielding check valve 21 operates on the seat 20. It is held yieldingly against the seat by a spring 22.

A plunger 23 forms a sliding fit with the walls of the chamber 18. The plunger in traversing the chamber 18 opens and closes the passage 16ª, thereby forming a valve so that in the forcing movement of the plunger 23 the plunger itself cuts off the passage 16ª and prevents a return movement of grease to the supply cylinder. The forcing plunger 23 is connected with an operating plunger 24. The plunger 24 is arranged in a cylinder 25 formed in the head 2ª, the nozzle fitting 17 being secured to this cylinder by screws 26. A spring 27 yieldingly returns the operating plunger to the upward, or charge-receiving position.

A pipe 28 leads from the supply fitting 5 and is connected with a manually operated valve 29, this valve having a seat 30, a valve head 31, a stem 32 extending from the valve head and an operating button 33. A nipple 34 connects the valve 29 with the upper end of the cylinder 25.

In the operation of the device, the cylinder 1 is filled with grease, and air is turned on the cylinder above the plunger 3. This air is allowed to remain on the plunger 3 during the operation of the device. A connection is made to a lubricating opening to be filled. The button 33 is pressed admitting air to the cylinder 25 above the operating plunger 24. The plunger 23 is forced forward closing the passage 16ª and upon the closure of the passage 16ª opening the valve 21 and forcing grease through the nozzle. The spring 22 is of such strength that it will maintain the valve 21 in closed position against the pressure delivered by way of the plunger 3 but will open on the increased pressure delivered to the forcing plunger 23 by reason of the larger area of the plunger 24.

Grease is very often delivered from the nozzle 19 through a flexible tube to the point of use. Ordinarily such a tube is connected to the grease fitting at the point of use. As the grease is forced into the tube and it is expanded under the pressure of the grease this pressure will be maintained on the grease contained in the tube after the air is cut off from the plunger 24 by reason of the closing of the valve 21. This takes place more or less from the closing of the grease passages in the article being lubricated but more particularly where there is a positive closure of such passages. Under these conditions by reason of this excessive pressure which is maintained on the grease after the closing of the valve 21 it is very difficult to disconnect the tube from the lubricating device. To relieve this pressure we have provided a bypass around the valve 21 comprising ports 35 an 36 leading to a socket 37, the port 35 being below the valve and the port 36 above the valve. A valve 38 in the form of a screw-threaded plug is arranged in a socket 37 and is adapted to close the bypass. The bypass also has utility in that by opening this bypass grease may be delivered through the action of the plunger 3 through the nozzle completely emptying the cylinder 1.

By forming the air passage 28 in approximate alinement with the nozzle this air conduit may be used as a handle for the device and where pressure is to be exerted in forming the connection at the nozzle it is particularly advantageous in being in alinement therewith.

With some types of fittings it is desirable to retard the out-flow of lubricant so that the connection with the fitting to be lubricated may be more readily maintained. We, therefore, provide an attachment 39 having a restricted opening 40 through which the lubricant passes. This retards the movement of the lubricant sufficiently to enable the operator to maintain the connection with the fitting to be lubricated.

What we claim as new is:—

1. In a lubricating gun, the combination of a lubricant supplying means; a nozzle; an air-actuated charge forming and forcing device receiving its supply from said means and delivering the same to the nozzle; an air supply conduit leading to the device, said supply conduit being approximately in axial alinement with the nozzle and forming a handle for the gun; and a controlling valve in the alined and handle forming conduit controlling said conduit and operative by an operator grasping the conduit.

2. In a lubricating gun, the combination of a supply cylinder; a crowding means in the cylinder; a nozzle; a connection between the nozzle and the cylinder; an air-actuated charge forming and forcing device receiving its supply from the connection and delivering the same to the nozzle; and an air supply conduit leading to the device, said conduit being abreast and spaced from the cylinder and approximately in alinement with the nozzle and forming a handle for the gun.

3. In a lubricating gun, the combination of a lubricant supplying means comprising a cylinder and crowding means therein and air connections subjecting the crowding means to a constant crowding air pressure; a nozzle; and an air-actuated charge forming and forcing device comprising a plunger; a cylinder in which the plunger operates, said cylinder being connected with the supply means through a port and delivering its discharge to the nozzle, said plunger operating over said lateral opening and closing the same during the forcing movement; a check valve between the nozzle and the port; and a spring closing the check valve, said spring having a strength closing the check against the pressure of the crowding means but yielding under the pressure of the forcing device.

4. In a lubricating gun, the combination of an individual reciprocating charge forming and forcing device, said device forming a charge with each reciprocation; a nozzle leading therefrom; a check valve in the nozzle; a bypass around the check valve; a bypass valve controlling the bypass; a grease supply chamber delivering grease to the forcing device; a crowding means exerting pressure on the grease as it is delivered; and air connections subjecting the crowding means to a constant crowding air pressure.

5. In a lubricating gun, the combination of a supply chamber; a crowding device in the chamber crowding grease therefrom; air connections subjecting the crowding device to constant crowding air pressure; an individual charge forming and forcing device receiving its supply from the chamber; a nozzle leading from the charge forming device; a check valve in the nozzle; a spring closing the check valve, said spring being of a strength closing the check against the pressure of the crowding device but yielding under the pressure of the forcing device; a bypass around the check valve; and a bypass valve controlling the bypass.

6. In a lubricating gun, the combination of a supply cylinder; a crowding means in the supply cylinder comprising a plunger; an air supply means; a branch leading from the air supply means to the cylinder and operating on the plunger therein to crowd grease forward; an individual charge forming and forcing device at the forward end of the gun; a connection between the device and the cylinder; a conduit leading from the air supply means to the device, said conduit forming a handle for the gun; a nozzle leading from the forcing device; a check valve in the nozzle; a bypass around the check valve; and a valve closing the bypass.

7. In a lubricating gun, the combination of a supply cylinder; a crowding means in the supply cylinder comprising a plunger; an air supply means; a branch leading from the air supply means to the cylinder and operating on the plunger therein to crowd grease forward; an individual charge forming and forcing device at the forward end of the gun; a connection between the device and the cylinder; a conduit leading from the air supply means to the device, said conduit forming a handle for the gun; a nozzle leading from the forcing device; a check valve in the nozzle; a bypass around the check valve; a valve closing the bypass; and a spring operating on the check valve and closing the same against the pressure in the cylinder but yielding to the pressure of the forcing device.

8. In a lubricating gun, the combination of a fluid-actuated charge forming and forcing device; and a nozzle leading therefrom, said nozzle having a restricted opening.

9. In a lubricating gun, the combination of a supply cylinder; an air-actuated plunger in the supply cylinder; a charge forming and forcing device; a head for the cylinder having a port leading from the supply cylinder to the charge forming and forcing device and a filling opening; and a removable cover in the filling opening.

In testimony whereof we have hereunto set our hands.

GEORGE B. WILSON.
KARL C. EAGLEY.